I. H. RANDALL.
Car Roof.

No. 234,063. Patented Nov. 2, 1880.

Attest:
R. Hayes.
F. L. Barrows.

Inventor:
Isaac H. Randall,
per Edward Dummer,
Atty.

N. PETERS, PHOTO-LITHOGRAPHER, WASHINGTON, D. C.

UNITED STATES PATENT OFFICE.

ISAAC H. RANDALL, OF BOSTON, MASSACHUSETTS.

CAR-ROOF.

SPECIFICATION forming part of Letters Patent No. 234,063, dated November 2, 1880.

Application filed February 14, 1880.

*To all whom it may concern:*

Be it known that I, ISAAC H. RANDALL, of Boston, in the county of Suffolk and State of Massachusetts, have invented a new and useful Improvement in Street-Cars, which improvement is fully set forth in the following specification, reference being had to the accompanying drawings.

My invention relates to the roofs of street-cars; and it consists in placing a lantern-box on the roof of a street-car of a certain class of street-cars as now constructed—namely, with a main roof of considerable inclination or pitch, the central part of which is cut away or open, there being over this opening another or supplemental roof of less inclination or pitch than the roof which covers the greater part of the body of the car; or, in other words, my invention consists in raising a part of the said supplemental roof and placing in the space at the sides and ends between said supplemental roof and its raised part sashes containing glass set in the frame-work for supporting said raised part, whereby space is given within the car for a lamp or lamps supported at the top of the car, and the light therefrom may shine through said glass, which glass may have letters or numbers thereon, or be colored to indicate the destination of the car, or for other purposes.

Figure 1:
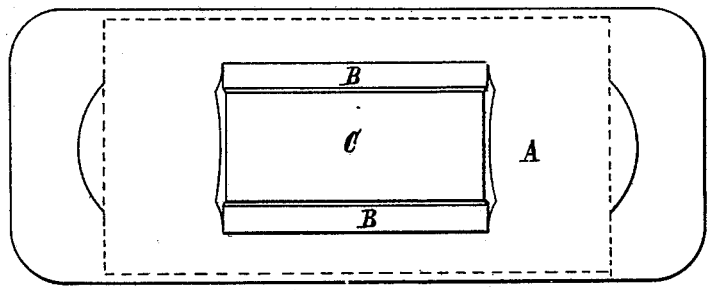
Figure 2:
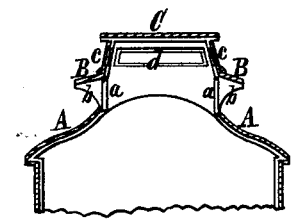
Figure 3:
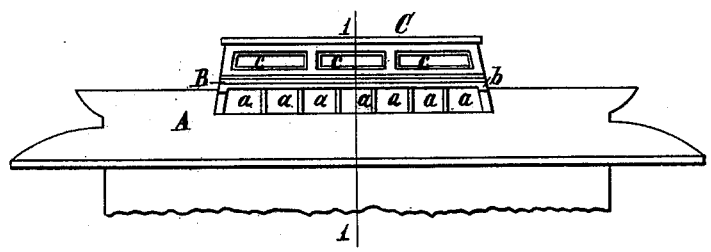
Figure 4:
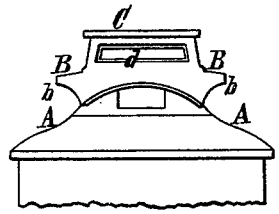

In the drawings, Figure 1 is a plan view of a roof of a street-car embodying my invention. Fig. 2 is a transverse section taken on line 1 1 in Fig. 3. Fig. 3 is a side elevation, and Fig. 4 an end elevation, of the roof shown in Fig. 1.

The roof of a common and desirable class of street-cars is composed of a main roof, A, of considerable inclination or pitch, covering the greater part of the car, and a supplemental roof, B, of less inclination or pitch, covering the central part of the car, there being an opening in the center of the main roof A, which is covered by the supplemental roof B. There is thus formed at the sides a space between the main roof A and the supplemental roof B, having one or more openings, *a*, in which may be set sashes containing glass, gauze, or movable panels for ventilation, or fixed and close panels, as may be deemed most desirable. The supplemental roof B projects somewhat over the main roof A at the sides, as shown at *b*, to protect the openings *a*, glass, or ventilators, or panels set therein.

Such being the present construction of the roof, I improve the same by raising a part of the supplemental roof B, making such raised part C flat, or of such inclination or pitch as may be considered best. Between the supplemental roof B and the raised part C, at the sides and both ends, is a space filled in with a wall and frame-work, leaving, however, openings *c* at the sides and openings *d* at the ends, as large and many as is desirable, in which I place sashes containing glass. By raising a part, C, of the supplemental roof B, there being an opening in the roof B corresponding to and covered by the roof C, there is ample room to place a lamp or lamps within the car supported under the roof C and above the heads of passengers.

The roof C, together with the sides containing the panes of glass *c* and the ends containing the glass *d*, form a lantern-box, whereby the lamp or lamps within may shed light outward from the car in all directions, so that the color of the glass, or the letters or numbers thereon, may be readily seen and the belonging or destination of the car easily recognized by one outside the car, and, this lantern being large and conspicuous, by a person at quite a distance.

The rafters, ribs, or supports—that is, the whole frame-work of the whole roof, composed of the main roof A, supplemental roof B, and raised portion or upper roof, C—may be of the general arrangement and construction of this class of roofs without my invention, making such change and adaptation to embody my invention as will readily occur to any mechanic skilled in the construction of street-car roofs.

My invention is particularly useful, since I place the lantern-box having the desirable feature of glass at the sides and ends on a car of a well-known and popular construction, and am able to easily alter over old cars and greatly improve them both in respect to beauty and utility.

I claim as my invention—

In combination with the main roof A and supplemental roof B, constructed as described, the lantern-box formed of the roof C and walls having glass *c* at the sides and glass *d* at the ends, substantially as and for the purpose hereinbefore set forth.

ISAAC H. RANDALL.

Witnesses:
R. HAYES,
EDW. DUMMER.